(12) United States Patent
Yoon

(10) Patent No.: US 9,937,456 B2
(45) Date of Patent: Apr. 10, 2018

(54) AIR PURIFICATION DEVICE

(71) Applicant: Byung Yong Yoon, Paju-si (KR)

(72) Inventor: Byung Yong Yoon, Paju-si (KR)

( * ) Notice: Subject to any disclaimer, the term of this patent is extended or adjusted under 35 U.S.C. 154(b) by 0 days.

(21) Appl. No.: 15/125,951

(22) PCT Filed: Mar. 13, 2015

(86) PCT No.: PCT/KR2015/002453
§ 371 (c)(1),
(2) Date: Sep. 13, 2016

(87) PCT Pub. No.: WO2015/137767
PCT Pub. Date: Sep. 17, 2015

(65) Prior Publication Data
US 2017/0095765 A1    Apr. 6, 2017

(30) Foreign Application Priority Data

Mar. 14, 2014  (KR) .................. 10-2014-0030093

(51) Int. Cl.
*B01D 47/08*     (2006.01)
*B01D 45/16*     (2006.01)
(Continued)

(52) U.S. Cl.
CPC ............. *B01D 47/06* (2013.01); *B01D 47/18* (2013.01)

(58) Field of Classification Search
None
See application file for complete search history.

(56) References Cited

U.S. PATENT DOCUMENTS 3,714,764 A * 2/1973 Gething ................ B01D 45/14
                                                         261/79.2
3,800,513 A * 4/1974 Lappin .................. B01D 47/06
                                                         261/79.2
(Continued)

FOREIGN PATENT DOCUMENTS

CN          1360513 A       7/2002
CN        201658921 U      12/2010
(Continued)

OTHER PUBLICATIONS

Translation of GB234109A, accessed Feb. 17, 2017.*

*Primary Examiner* — Amber R Orlando
*Assistant Examiner* — Phillip Shao
(74) *Attorney, Agent, or Firm* — Maschoff Brennan

(57) ABSTRACT

The present invention provides an air purification device which cleans and purifies pollutants contained in air by using a spray liquid sprayed when air is transferred and, particularly, the air purification device can control the transfer speed of the air transferred in a transfer space so as to increase air purification efficiency. To this end, the air purification device comprises: a body (4) provided with a movement passage having an inlet (2) and an outlet (3) through which air flows in and out; and a spraying means formed to receive washing water from the outside and to spray the washing water into the movement passage of the body (4), thereby purifying the air moving along the movement passage by using the washing water, wherein the body (4) is provided with the movement passage which is a pipe having a circular tube shape, and the movement passage includes a filtering means for transferring the air while controlling the moving speed of the air passing through the movement passage, and filtering foreign substances when the air passes there through.

1 Claim, 3 Drawing Sheets

(51) Int. Cl.
*B01D 47/06* (2006.01)
*B01D 47/18* (2006.01)

(56) References Cited

U.S. PATENT DOCUMENTS

| | | | | |
|---|---|---|---|---|
| 6,152,729 A | * | 11/2000 | Rinker | ............ C21B 13/105 |
| | | | | 266/173 |
| 6,402,815 B1 | | 6/2002 | Son | |
| 2012/0055341 A1 | | 3/2012 | Niioka | |

FOREIGN PATENT DOCUMENTS

| | | | | |
|---|---|---|---|---|
| CN | 102307649 A | | 1/2012 | |
| GB | 234109 A | * | 1/1926 | ............ B01D 47/08 |
| JP | H09-210341 A | | 8/1997 | |
| KR | 10-1994-0023518 A | | 11/1994 | |
| KR | 10-0138821 B1 | | 4/1998 | |
| KR | 10-2001-0009613 A | | 2/2001 | |
| KR | 10-2006-0055008 A | | 5/2006 | |
| KR | 10-2008-0069736 A | | 7/2008 | |

* cited by examiner

AIR PURIFICATION DEVICE

TECHNICAL FIELD

The present invention relates to an air purification device which purifies air when air is transferred and discharges the air, and more particularly, to an air purification device which cleans and purifies pollutants contained in air by using a spray liquid sprayed when air is transferred, and particularly, can control the transfer speed of the air transferred in a transfer space so as to increase air purification efficiency.

BACKGROUND ART

In general, methods for purifying by removing foreign substances contained in air include a dry type method and a wet type method or a mixed method of a dry type and a wet type.

A representative example of the dry type method is a method which uses a filter.

However, in the case of the filter method, dust of fine particles is not completely collected and purified and, when a gas containing dust flows in, the dust is accumulated on the surface of the filter and dust-collection efficiency greatly deteriorates due to the blockage in the filter, and the filter may be a breeding ground for disease germs or germs.

Accordingly, there is a problem in maintenance accompanied by periodic replacement, and the non-woven fabric of the disused filter may generate secondary environmental pollutants and may be the main cause of environmental pollution.

In addition, as another dry type method, a gas purification device including photocatalyst, electrostatic precipitation, and plasma has been suggested. However, gas purification efficiency is low, and also, an anion-generating gas purification device is known as having a side effect of generating ozone which is harmful to human body health hygiene.

A centrifugal air purification device which is configured in such a dry type can achieve gas purification efficiency of 90-95% theoretically, but is not able to collect and purify dust of fine particles having a size of 5 or less, pollen, cigarette smoke, and harmful gas, which are harmful to human body health hygiene. Most of the air purification devices are manufactured for industrial use and thus their use is limited to simply removing dust in air by centrifugally separating the dust.

On the other hand, the wet type method is a method which induces a gas flow in a gas purification device and purifies a gas by using viscosity and adhesion force of water by bringing the gas into contact with a two-dimensional water film surface area.

However, there is a problem that only the pollutants of the gas in contact with the water film surface area are removed by using the viscosity and adhesion force of water, and most of the pollutants which are not in contact with the water film surface area are not removed. In addition, a gas containing excessive moisture is discharged, and thus there is a problem that a precision instrument is corroded.

From the perspective of aeromechanics, the ability of purifying fine dust smaller than 0.1 μm and air purification efficiency in the related-art wet type gas purification device are relatively high in comparison to the other types of gas purification devices, but the air purification efficiency is limited since it is less than 85% theoretically. In addition, the related-art wet type gas purification device does not have its own sterilization function for disease germs or microorganism, and thus may be a breeding ground for disease germs and is unsanitary. In addition, there is a problem that cleaning water is sterilized by treating with chemicals In particular, the related-art wet type method has a problem that a purified gas and moisture are recombined with each other.

Referring to the related-art patent technologies, Korean Patent Publication No. 10-1994-0023518 discloses the feature of spraying moisture through a nozzle by using a pump, and discloses the feature of separating air and moisture without a pump, and Korean Patent Publication No. 10-2006-0055008 discloses the features of supplying washing water from a lower portion to an upper portion, and then scattering the washing water through three scattering means and bringing the washing water into contact with air moving up from the lower portion.

In addition, Korean Patent Registration No. 10-604643 (titled "Complex Air Purification Device") discloses an air purification device which is configured to include a cleaning device for periodically cleaning the surface of photocatalyst, thereby increasing air purification efficiency and continuously maintaining a purifying ability, and furthermore, is able to separate and remove harmful elements such as fine dust by cleaning air using a water filter in parallel with the photocatalyst, and also, changes the suction and discharge directions of indoor air according to a condition, and diffuses and circulates stagnant air on an upper layer when the air purification device is driven by using an elevator type fan.

DETAILED DESCRIPTION OF THE PRESENT DISCLOSURE

Technical Object

However, the related-art air purification devices described above are designed to remove foreign substances by allowing air to pass through a water filter or a typical filter when air is transferred, and have a problem that it is difficult to maximize air purification efficiency.

That is, there is a problem that the transfer speed of air cannot be efficiently controlled.

The present invention has been developed in order to solve the above-mentioned problems, and an object of the present invention is to provide an air purification device which cleans and purifies pollutants contained in air by using a spray liquid sprayed when air is transferred, and particularly, can efficiently control the transfer speed of the air transferred in a transfer space so as to increase air purification efficiency.

Technical Solving Method

To achieve the above-stated object of the present invention, an air purification device according to the present invention includes a body provided with a movement passage having an inlet and an outlet through which air flows in and out, and a spraying means formed to receive washing water from the outside and to spray the washing water into the movement passage of the body, thereby purifying the air moving along the movement passage by using the washing water, wherein the body is provided with the movement passage which is a pipe having a circular tube shape, and the movement passage includes a filtering means for transferring the air while controlling the moving speed of the air passing through the movement passage, and filtering foreign substances when the air passes therethrough.

The filtering means may include a rotary rod which is disposed inside the body, and receives a rotational force from the outside and is rotated, and a filtering film which is connected with the rotary rod in a spiral shape.

Advantageous Effect

The air purification device according to the present invention as described above can purify air by removing foreign substances from the air by spraying the washing water, and also, by removing foreign substances through the filtering film. In particular, by adjusting the air transfer speed in the body in relation to an inflow pressure when the air flows in the body, the length of time the air is in contact with the washing water is efficiently adjusted, and the moving speed of the air in the movement passage of the body is reduced while the smooth inflow of indoor air is maintained, so that air purification efficiency can be effectively enhanced.

BEST MODE FOR EMBODYING THE INVENTION

Figure 1:
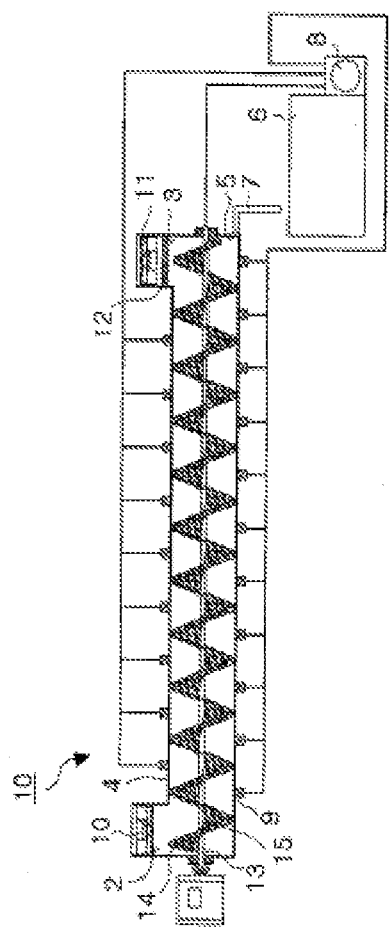
FIG. 1 is a schematic cross section view showing an air purification device according to an exemplary embodiment of the present invention.

Hereinafter, an air purification device according to preferred embodiments of the present invention will be described in detail with reference to the accompanying drawings.

Various changes in form can be made to exemplary embodiments of the present invention, and the scope of the present invention should not be interpreted as being limited to the embodiments described below. The exemplary embodiments are provided to assist an ordinary person skilled in the art in comprehensively understanding the present invention. Accordingly, the shapes of elements in the drawings may be exaggeratedly expressed to more clearly describe the invention. It should be noted that, in the explanation of the drawings, the same reference numerals are used for the same elements. In the following description, detailed descriptions of well-known functions or configurations will be omitted since they would unnecessarily obscure the subject matters of the present invention.

Figure 2:
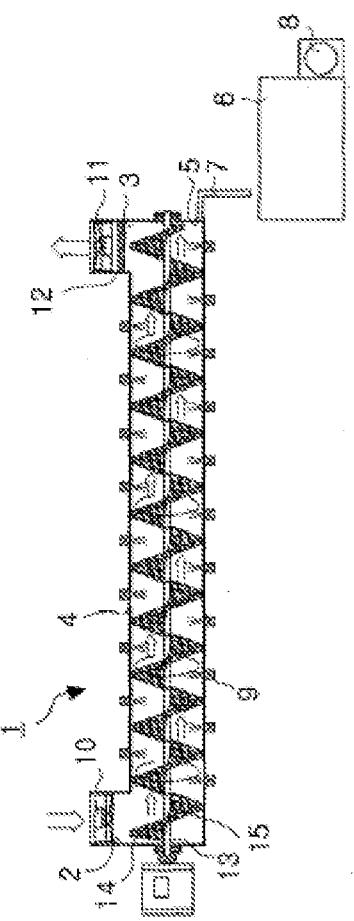
FIG. 2 is a schematic cross section view showing a use state of the air purification device according to an exemplary embodiment.
Figure 3:
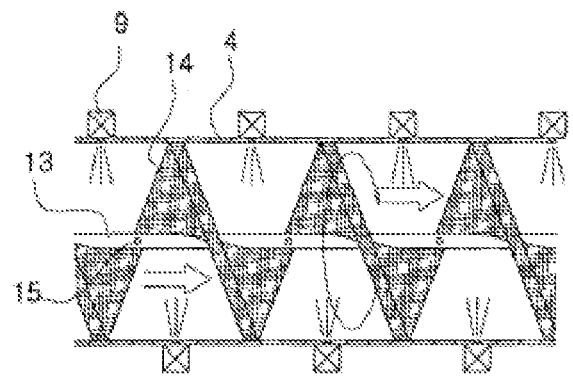
FIG. 3 is a cross section view showing an example of use of the air purification device according to an exemplary embodiment.

FIGS. 1 to 3 are views showing an air purification device according to an exemplary embodiment of the present invention. The air purification device 1 according to an exemplary embodiment includes a body 4 provided with a movement passage having an inlet 2 and an outlet 3 through which air flows in and out, and a spraying means formed to receive washing water from the outside and to spray the washing water into the movement passage of the body 4, thereby purifying the air moving along the movement passage by using the washing water.

That is, the washing water sprayed through the spraying means is brought into contact with the air moving inside the body 4, thereby filtering foreign substances contained in the air and purifying the air.

It is preferable that the body 4 is provided with a drain hole 5 to allow waste water in which foreign substances contained in air adhere to each other and which is dropped down to be discharged to the outside therethrough, and a drain pipe 7 is connected to the drain hole 5 to guide the discharged waste water to a storage tub 6 and to store the waste water therein.

In addition, it is preferable that the bottom surface of the body 4 is formed to be inclined downwardly toward the drain hole 5, but this should not be considered as limiting.

In addition, it is preferable that the waste water stored in the storage tub 6 is pumped to the spraying means through a circulation pump 8 and is recycled, but this should not be considered as limiting.

It is preferable that the spraying means includes a plurality of nozzles 9 provided on the body 4 to receive the washing water and spray the washing water into the body 4.

It is preferable that a supply pump 10 is disposed at the inlet 2 to transfer indoor air to supply the indoor air to the inside of the body 4, and a discharge pump 11 is disposed at the outlet 3 to transfer the air from the inside of the body 4 to the outside.

That is, through the supply pump 10 and the discharge pump 11, the indoor and outdoor air is circulated in the inside of the body 4 and is purified.

In addition, it is preferable that a dehumidification filter 12 is disposed at the outlet 3 to filter and separate moisture contained in the air which is discharged to the outside through the outlet 3. In this case, by removing moisture from the air which is discharged through the outlet 3, indoor humidity can be prevented from excessively increasing.

In the air purification device 1 formed according to the above-described exemplary embodiment, the body 4 is provided with the movement passage which is a pipe having a circular tube shape.

That is, the air is transferred through a cylindrical space, and, since a typical pipe is applied when the body 4 is manufactured, it is easy to manufacture the air purification device.

In addition, in the air purification device 1 according to the above-described exemplary embodiment, the movement passage is provided with a filtering means which is configured to transfer the air while controlling the moving speed of the air passing through the movement passage, and also, to filter foreign substances when the air passes therethrough.

That is, the filtering means is configured to physically transfer the air flowing in through the inlet 2, and also, to filter foreign substances when the air passes therethrough.

The filtering means includes a rotary rod 13 which is disposed inside the body 4 and receives a rotational force from the outside and is rotated, and a filtering film 14 which is connected with the rotary rod 13 in a spiral shape.

That is, the filtering means is rotated by the rotary rod 13 to transfer the air toward the outlet 3.

In this case, when a transfer pressure applied to the air which is transferred to the outlet 3 through the inlet 2 is greater than the transfer speed of the air by the rotation of the filtering film 14, the air flowing in the body 4 through the inlet 2 is transferred while passing through the filtering film 14 by the transfer pressure when the air is transferred at the transfer speed by the rotation of the filtering film 14.

Accordingly, the air which passes through the body 4 is purified by removing foreign substances by using the washing water sprayed by the spraying means, and also, by filtering and removing foreign substances when the air passes through the filtering film 14.

It is preferable that the filtering film 14 is formed of porous material such as a non-woven fabric, activated carbon, coir fiber, sponge, or the like, and is formed of material which allows foreign substances to be removed from air when the air passes therethrough.

It is preferable that the rotary rod 13 is formed in a tubular shape having a space formed therein, and a plurality of nozzle holes 15 are formed on the rotary rod 13 to receive the washing water and spray the washing water toward the movement passage of the body.

Figure 4:
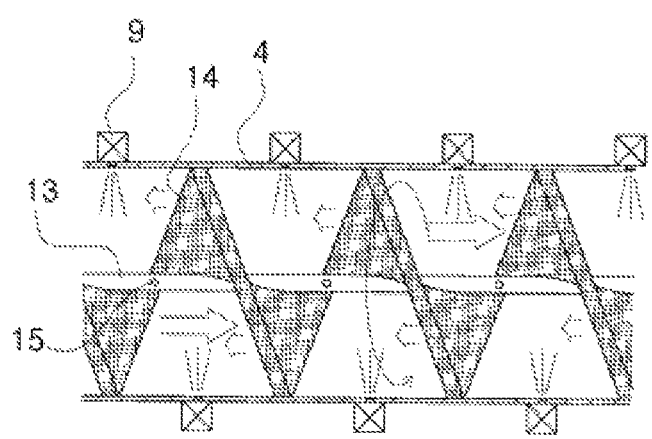
FIG. 4 is a cross section view showing another example of use of the air purification device according to an exemplary embodiment.

As shown in FIG. 4, the rotary rod 13 may be rotated in the reverse direction by user's selection, and may apply a reverse transfer pressure to transfer the air from the inside of the body 4 toward the inlet 2.

In this case, there is a limit that the pump pressure of the supply pump 10 and the discharge pump 11 provided at the inlet 2 and the outlet 3 should be greater than the reverse transfer pressure of the air moving by the filtering means. However, the transfer speed of the air in the movement passage is reduced and thus purification efficiency can be increased, and through transfer of the filtering film 14 is promoted and thus a filtering rate can be further increased.

The effect of the air purification device according to the above-described exemplary embodiment will be described in detail hereinafter.

The air purification device 1 according to the exemplary embodiment is installed indoors or outdoors and is applied to purify air by removing foreign substances contained in the air when the air is circulated from the inside to the outside.

In order to purify indoor or outdoor air using the air purification device 1 according to the exemplary embodiment, the supply pump 10 and the discharge pump 11 are driven first to supply indoor or outdoor air to the inside of the body 4 through the inlet 2, and to discharge the air supplied to the inside of the boy 4 to the outside and circulate the air.

When the indoor or outdoor is circulated passing through the inside of the body 4 as described above, washing water is supplied from the outside through the spray nozzles 9 and the nozzle holes 15 of the rotary rod 13, and is sprayed into the body 4.

When the washing water is sprayed into the body 4 as described above, a rotational force is applied to the rotary rod 13 to rotate the filtering film 14. Then, the air is guided along the surface of the filtering film 14 fixed to the rotary rod 13 in the spiral shape, and is transferred from the inlet 2 to the outlet 3.

In this case, foreign substances contained in the air are removed by the washing water sprayed by the spray nozzles 9 and the nozzle holes 15, and are discharged to the drain hole 5, and then, are stored in the storage tub 6.

The air is transferred with the transfer pressure transferred in the body 4 due to the pump pressure of the supply pump 10 and the discharge pump 11, but is blocked by the filtering film 14, so that the transfer pressure is offset.

In this case, the filtering film 14 is rotated, thereby transferring the air toward the outlet at desired transfer speed, and some air is transferred passing through the filtering film 14 and thus is filtered separately by a filtering operation of the filtering film 14.

As described above, by reducing the air transfer speed in the body 4 in relation to an inflow pressure when the air flows in the body 4, the length of time the air is in contact with the washing water is efficiently prolonged.

That is, air purification efficiency is effectively enhanced by reducing the movement speed of the air in the movement passage of the body 4, while smoothly maintaining the inflow of indoor air.

In addition, the air can be purified by removing foreign substances from the air by spraying the washing water, and also, by removing foreign substances through the filtering film 14, so that the purification is efficient.

In addition, the washing water collecting the foreign substances contained in the air as described above is discharged to and stored in the storage tub 6 through the drain hole 5.

In this case, the washing water stored in the storage tub 6 is supplied to the spray nozzles 9 and the rotary rod 13 by the circulation pump 8, so that the washing water can be recycled.

As described above, the air from which foreign substances are removed when the air passes through the inside of the body 4 is discharged to the outside by the pump pressure of the discharge pump 11. At this time, the air is discharged to the outside after moisture is removed from the air by the dehumidification filter 12.

Through the above-described process, the indoor or outdoor air can be efficiently purified.

The exemplary embodiments of the present invention described above are merely examples, and a person skilled in the related art could easily know that various changes can be made and other equivalent embodiments can be provided based on the descriptions provided herein. Therefore, it would be well understood that the present invention is not limited to the forms mentioned in the above-described descriptions. Accordingly, the technical protection range of the present invention should be defined by the technical idea of the appended claims. In addition, the present invention should be understood as including the spirit of the present invention defined in the appended claims and variants, equivalents, and substitutes existing in the range thereof.

What is claimed is:

1. An air purification device, comprising:
a body provided with a movement passage having an inlet and an outlet through which air flows in and out; and
at least one nozzle formed to receive washing water from the outside and to spray the washing water into the movement passage of the body, thereby purifying the air moving along the movement passage by using the washing water,
wherein the body is provided with the movement passage which is a pipe having a circular tube shape,
wherein the movement passage comprises a filtering device configured to transfer the air while controlling a moving speed of the air passing through the movement passage, and filtering foreign substances when the air passes therethrough,
wherein the filtering device comprises:
a rotary rod which is disposed inside the body, and which is configured to receive a rotational force from the outside, and
a filtering film which is connected with the rotary rod in a spiral shape,
wherein the rotary rod is formed in a tubular shape having a space formed therein, and comprises a plurality of nozzle holes formed thereon to receive the washing water and spray the washing water into the movement passage of the body,
wherein the rotary rod is configured to rotate in a reverse direction by a user's selection, and configure to apply a reverse transfer pressure to transfer the air from the inside of the body toward the inlet.

* * * * *